May 3, 1938. S. BAXENDALE 2,115,938
SUPPLEMENTAL STOCK FEEDING MEANS FOR MULTIPLE SPINDLE MACHINE TOOLS
Filed June 21, 1937 3 Sheets-Sheet 1

INVENTOR
SAMUEL BAXENDALE
BY
Whittemore Hulbert & Belknap
ATTORNEYS

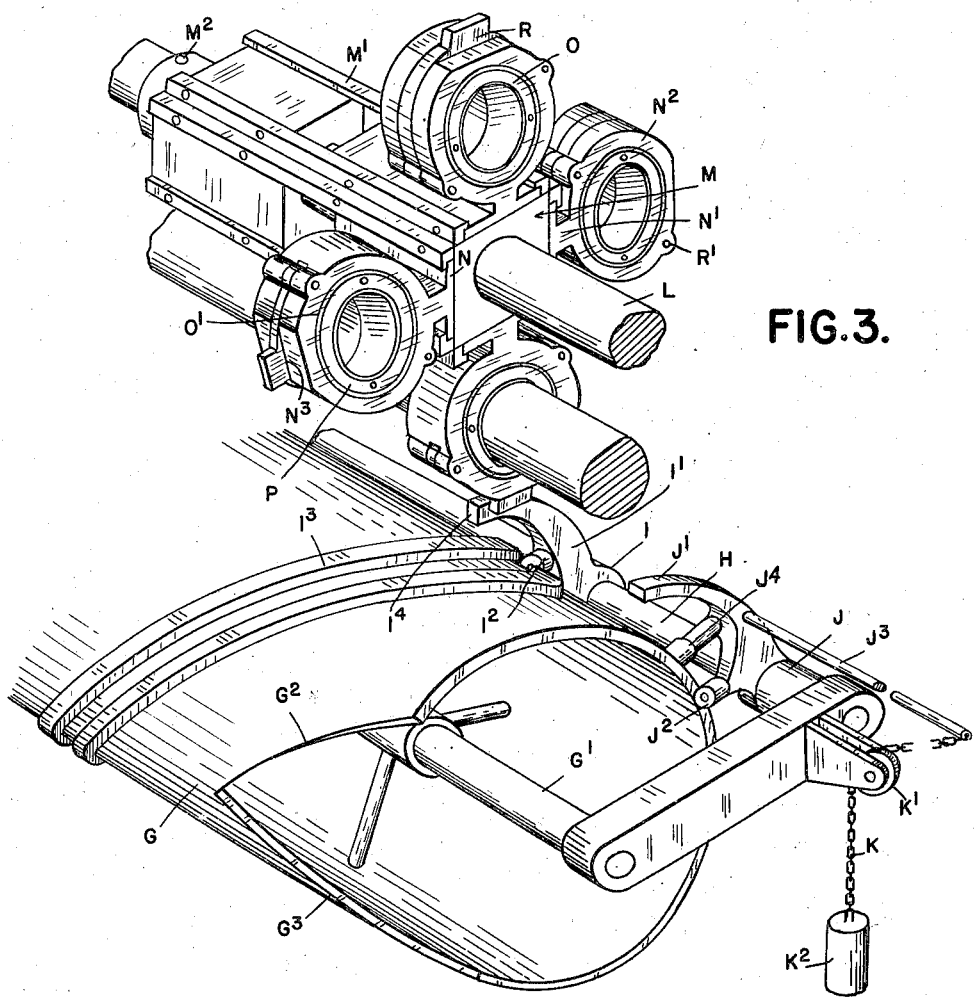

May 3, 1938.  S. BAXENDALE  2,115,938
SUPPLEMENTAL STOCK FEEDING MEANS FOR MULTIPLE SPINDLE MACHINE TOOLS
Filed June 21, 1937  3 Sheets-Sheet 3

INVENTOR
SAMUEL BAXENDALE
ATTORNEYS

Patented May 3, 1938

2,115,938

UNITED STATES PATENT OFFICE 2,115,938

SUPPLEMENTAL STOCK FEEDING MEANS FOR MULTIPLE SPINDLE MACHINE TOOLS

Samuel Baxendale, Dearborn, Mich.

Application June 21, 1937, Serial No. 149,540

5 Claims. (Cl. 29—62)

The invention relates to automatic machine tools of that type including a plurality of hollow spindles mounted on a revoluble carrier or turret which is periodically indexed to rotatively advance the spindles from one station to another to successively register the same with the operating tools. The stock used in such machines is usually in the form of long bars which are fed into the hollow spindles being advanced therein, once for each cycle of the turret. The advancing means usually employed is a collet within each hollow spindle having a tubular shank extending out from the rear end thereof. Each of these shanks at one point in the cycle is brought into operative relation to reciprocating means, with the result that the collet is advanced within the spindle and carries the stock bar therewith.

The range of work which may be performed by such machines is limited by the internal diameter of the feed collet and its tubular shank. To accommodate a greater range, machines are made in various sizes, but the larger the machine the slower will be its performance of work. It frequently happens that there is work to be performed on stock which only slightly exceeds the maximum limit of one size machine and where this is the case it may be necessary for a manufacturer to install two machines where the work only very slightly exceeds the capacity of one.

It is the object of the present invention to provide an attachment to machines of the type above described through which the normal maximum limit may be increased. To this end the invention consists in the construction as hereinafter set forth.

In the drawings:

Figure 3 is a perspective view showing the turret with my improvement applied thereto and also the actuating mechanism therefor;

Figure 1:
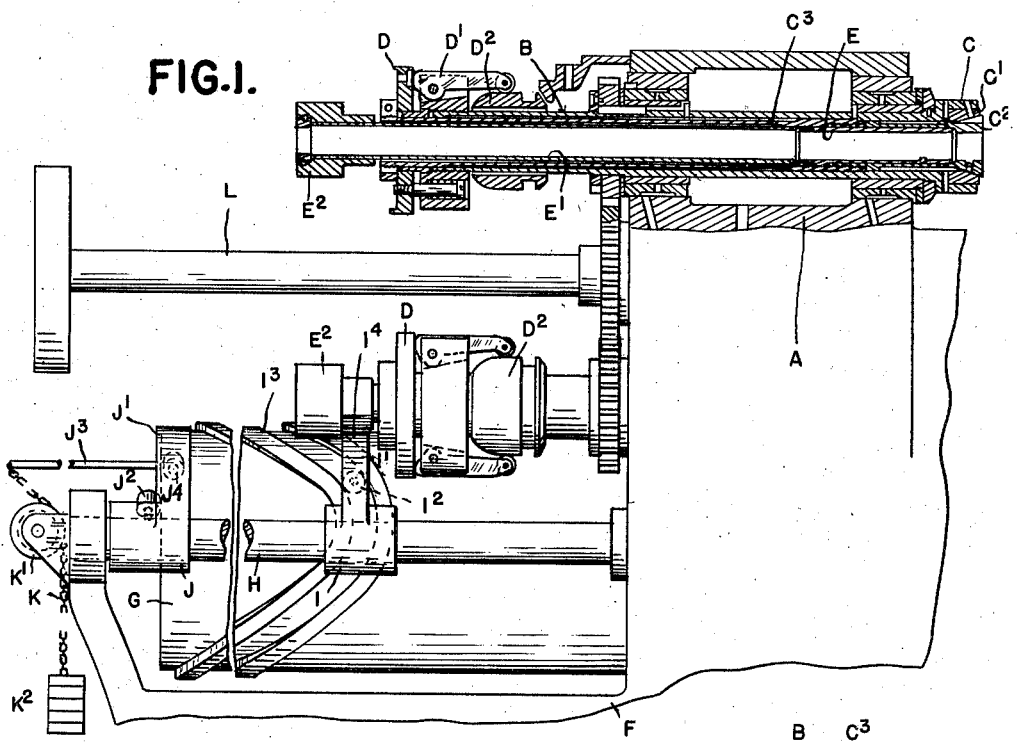
Figure 1 is a sectional side elevation of a machine of standard construction and without my improvement.
Figure 2:
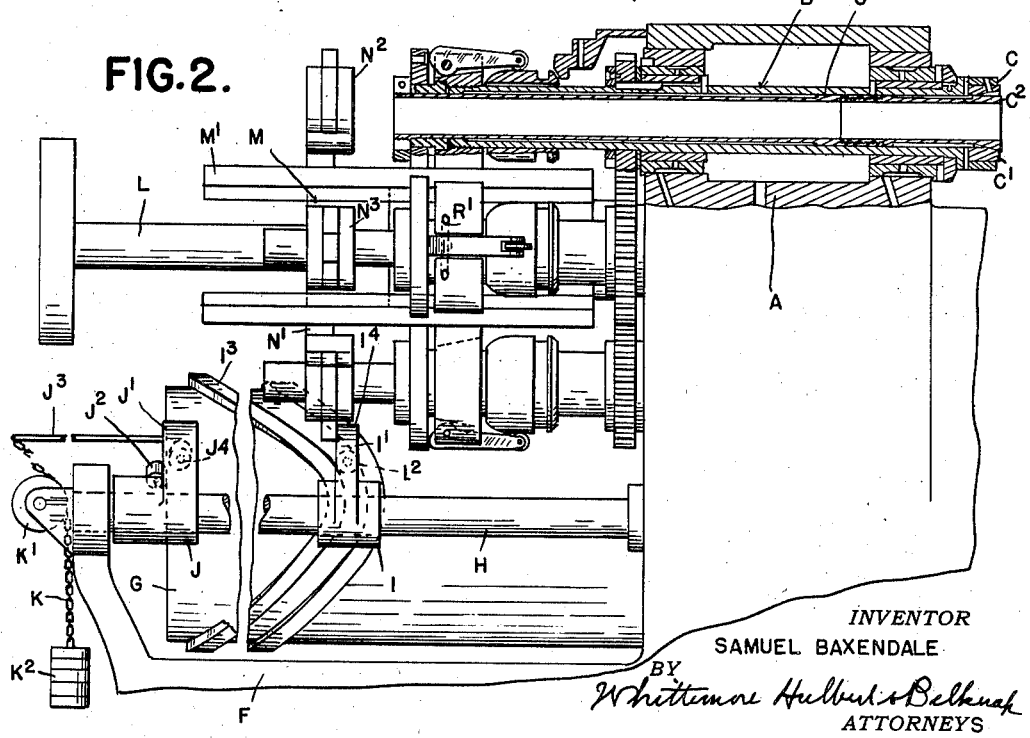
Figure 2 is a similar view of the same machine modified by my improved construction.
Figure 5:
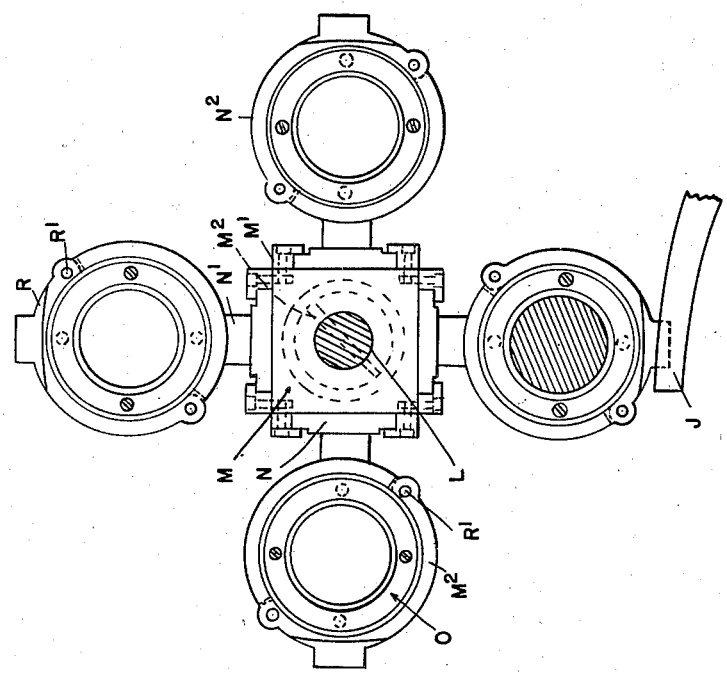
Figure 5 is a transverse section thereof.
Figure 4:
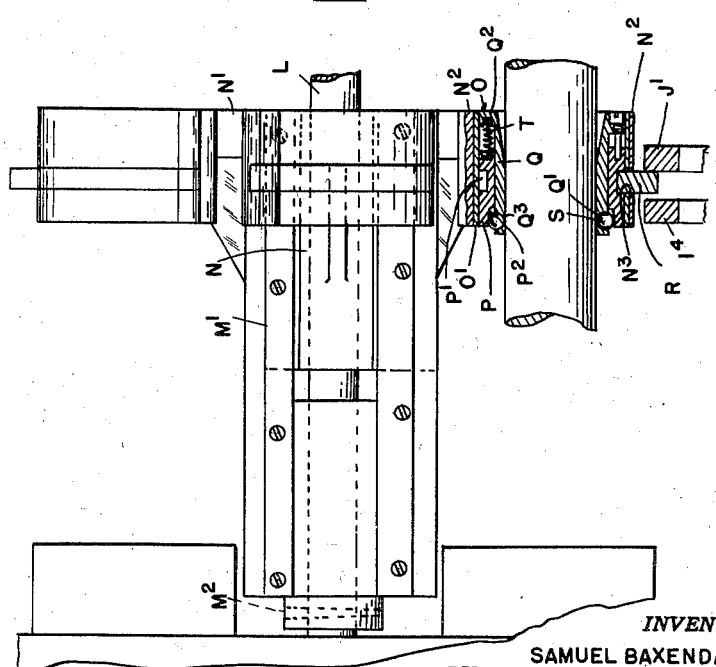
Figure 4 is a side elevation partly in section of the improved feed mechanism.

As shown in Figure 1, the multiple spindle automatic machine to which my improvements are applied comprises a rotary carrier or turret A for a plurality of hollow spindles B. Each of these spindles is provided at its forward end with a chuck or collet C which engages a conical socket C' in the spindle, and has a plurality of gripping jaws $C^2$ attached to a tubular shank $C^3$ passing out through the rear end of the spindle. This shank has mounted thereon at the rear end a collar D which is in operative relation to one or more bell crank levers D' actuated by a sliding cam collar $D^2$, the arrangement being such that a movement of the collar $D^2$ which actuates the bell crank D' will, through the collar D, draw the shank $C^3$ rearward, thereby moving the chuck jaws $C^2$ radially inward to grip the stock while it is being operated upon by the tools. In addition to the collet or chuck C for holding the work while being operated upon, there is a feed collet E which is within the tubular shank $C^3$ and is itself provided with a tubular shank E'. This shank E' projects rearward beyond the spindle and is provided at its rear end with a collar $E^2$. The turret A is mounted upon a frame F on which there is also mounted a rotary drum G. This drum is constantly revolved by a shaft G' in timed relation to the turret A so that one revolution of the drum is completed between each step of advancement of the turret. Parallel to the shaft G' is a shaft H on which is slidably mounted the sleeves I and J. The sleeve I has an arm I' carrying a roll $I^2$ which is in engagement with a spiral cam $I^3$ on the drum G. The sleeve J has an arm J' carrying a roller $J^2$ which bears against the end of the drum G and also a finger $J^4$ which bears against the cylindrical surface of the drum. There is also a shank $J^3$ extending rearward from the sleeve J and having connected to its rear end a chain K which passes over a sheave K' and has connected to its lower end a weight $K^2$. The drum G is cut away at $G^2$ to permit the forward travel of the collar J and roller $J^2$ under actuation of the weight $K^2$ and an inclined cam $G^3$ on the opposite side of this cut away portion forces these parts back to the original position. Thus during the greater portion of each revolution of the drum G, the collar J will be held stationary on the shaft H, but during the remainder of the revolution it will be moved forward and then returned. The collar I will move forward and rearward simultaneously with the movement of the collar J being positively actuated in both directions by the engagement of the roller $I^2$ with the cam $I^3$. The collar I is also provided with an arm $I^4$ forming an extension of the arm I' and, which during the portion of the cycle when the collars I and J are stationary is spaced from the arm J' and is positioned to receive therebetween the collar $E^2$ of one of the tubular shanks E'. During the subsequent movement of the collars J and I this shank E' will be first moved forward in the spindle C and then moved rearward. The forward movement feeds the stock bar which is frictionally engaged by the collet E. This, however, is not positively driven but only under the actuating force of the weight $K^2$. In its rearward movement the collar I is positively actuated by the cam $I^3$ so that it will carry the tubular shank E' and collet E rearward against the frictional resistance of the stock bar, which latter is held by the collet C.

The construction of machine as thus far described is one which has heretofore been used and the upper limit of its capacity is a stock bar no greater in diameter than the internal diameter of the tubular shank E'. To increase this capacity I have provided an auxiliary feed mechanism not using the collet E and tubular shank E' and which, therefore, permits of detaching these parts and increasing the internal diameter of the hollow spindle to that of the tubular shank $C^3$, the construction being as follows.

Extending rearward from the turret concentric with its axis and revolving therewith is the shaft L. On this shaft is mounted a polygonal member M having on the several sides thereof the longitudinally extending guides M' for engaging slides N. Each of these slides has projecting therefrom a bracket arm N' terminating in an annular bearing $N^2$ having a slot $N^3$ in a segment thereof. The axis of the bearing $N^2$ is in alignment with the axis of the corresponding hollow spindle B. O is a one-way internal clutch mounted in the bearing $N^2$ and comprising a bushing member O' directly engaging said bearing, an annular member P within the bushing O' and an annular member Q within the member P. The bushing O' and annular member P are locked from axial movement with respect to the bearing $N^2$ by a segmental member R. This is arranged in the slot $N^3$ of the bearing $N^2$, a registering slot in the bushing O' and a groove P' in the member P, while the opposite ends of the member R are locked to the bearing by pins R'. The member P has on its forward side the conical bearing $P^2$ for engaging a series of clutch balls S held in pockets Q' in said member. The member Q also has an outwardly extending collar $Q^2$ overlapping the end of the member P. Springs T engaging aligned pockets in said flange $Q^2$ and the member P resiliently urge the member Q in a direction to move the balls S toward the small end of the conical bearing $P^2$ and thereby to force them radially inward. The pockets Q' have retaining flanges $Q^3$ at their inner ends sufficient to prevent disengagement of said balls. The construction just described forms a one-way clutch for engagement with the stock bar which will permit free movement of said clutch in a rearward direction, but will grip the bar to feed the same in a forward direction. The member R projects outward beyond the bearing $N^2$ and is adapted to register with the space between the arms J' and $I^4$ similar to the registration of the collars $E^2$ with such space.

With the construction just described, whenever it is desired to use the machine with stock bars which are slightly larger in diameter than the internal diameter of the tubular shanks E', the latter are disengaged from the spindles B. The member M is then mounted upon the shaft L or if desired this member may remain permanently mounted on said shaft being held thereon in fixed position by a key $M^2$. The slides N may then be engaged with the guides M' and are positioned so that the members R will register as previously described. When thus arranged, stock bars larger in diameter than the internal diameter of the tubular shank E' but less than the internal diameter of the shank $C^3$ can be fed into the hollow spindles thereby increasing the capacity of the machine. This auxiliary feed mechanism is not intended for constant use as normally the work is fed by the collets E, but whenever it is desired to use slightly larger stock than can pass through these collets, then the latter are withdrawn from the spindles and the auxiliary feed is brought into action.

What I claim as my invention is:

1. In a machine tool, the combination with a turret and a plurality of revoluble hollow spindles mounted thereon adapted to be periodically advanced to successive stations, of an extension of said turret in rear of said spindles, a plurality of members slidably mounted on said extension, a one-way clutch carried by each of said members in axial alignment with the corresponding spindle adapted to engage a stock bar for said spindle, and axially reciprocating means located at one station adapted to successively engage said clutch-carrying members when in registration therewith and to advance the stock in said spindle.

2. In a machine tool, the combination with a turret and a plurality of revoluble hollow spindles mounted thereon adapted to be periodically advanced to successive stations, a shaft axially aligned with said turret and extending rearward therefrom, guideways mounted on said shaft, members slidably engaging said guideways, a one-way clutch member carried by each of the aforesaid members in axial alignment with the corresponding spindle and adapted to engage a stock bar for said spindle, and axially reciprocating means located at one of said stations adapted to engage each of said slidable members when in registration therewith and to thereby advance the stock in the spindle.

3. In a machine tool, the combination with a turret and a plurality of revoluble hollow spindles mounted thereon adapted to be periodically advanced to successive stations, a shaft axially aligned with said turret and extending rearward therefrom, guideways mounted on said shaft, members slidably engaging said guideways, a one-way clutch member carried by each of the aforesaid members in axial alignment with the corresponding spindle and adapted to engage a stock bar for said spindle, and axially reciprocating means located at one of said stations being positively actuated in a rearward direction and non-positively actuated in a forward direction, said reciprocating means being adapted to successively engage said slidable members when in registration therewith and to thereby advance the stock in the spindle.

4. In a machine tool, the combination with a turret and a plurality of revoluble hollow spindles mounted thereon adapted to be periodically advanced to successive stations, of an extension of said turret in rear of said spindles, guideways mounted on said extension, members slidably engaging the respective guideways including an annular portion in axial alignment with the corresponding spindle surrounding the stock bar therefor, axially reciprocating means located at one station adapted to successively engage said slidable members when in registration therewith, and a ball clutch in each of said annular members adapted to engage the stock and advance the same during the forward movement of said reciprocating member and to release the stock in the rearward movement of said member.

5. The combination with a machine tool of the type comprising a turret, a plurality of revoluble spindles mounted thereon adapted to be periodically advanced to successive stations, a work holding collet and a work feeding collet within each spindle having tubular shanks extending through the rear end of said spindle, and a reciprocating member located at one of said stations adapted to successively engage said tubular shanks when in registration therewith to operate said collets; of attachment means for feeding the stock when said work feeding collets and tubular shanks are removed from said hollow spindles including a plurality of members corresponding in number to said spindles axially slidably mounted on said turret, a one-way clutch carried by each of said members in axial alignment and in rear of the corresponding hollow spindle adapted to engage the stock bar for said spindle, and means on each of said members for engaging said reciprocating member when in registration therewith.

SAMUEL BAXENDALE.